United States Patent
Jansson et al.

(10) Patent No.: US 12,298,326 B2
(45) Date of Patent: May 13, 2025

(54) WIND VELOCITY ESTIMATION

(71) Applicant: TOPGOLF SWEDEN AB, Danderyd (SE)

(72) Inventors: Anton Mikael Jansson, Stockholm (SE); Joakim John Hugmark, Stockholm (SE); Daniel Forsgren, Enebyberg (SE)

(73) Assignee: Topgolf Sweden AB, Danderyd (SE)

( * ) Notice: Subject to any disclaimer, the term of this patent is extended or adjusted under 35 U.S.C. 154(b) by 0 days.

(21) Appl. No.: 18/868,144

(22) PCT Filed: May 16, 2023

(86) PCT No.: PCT/EP2023/063200
§ 371 (c)(1),
(2) Date: Nov. 21, 2024

(87) PCT Pub. No.: WO2023/227429
PCT Pub. Date: Nov. 30, 2023

(65) Prior Publication Data
US 2025/0116682 A1   Apr. 10, 2025

(30) Foreign Application Priority Data
May 24, 2022  (SE) .................................... 2250616-6

(51) Int. Cl.
G01P 5/02   (2006.01)
(52) U.S. Cl.
CPC ...................... G01P 5/02 (2013.01)
(58) Field of Classification Search
CPC ....................................................... G01P 5/02
USPC ............................................................ 73/861
See application file for complete search history.

(56) References Cited

U.S. PATENT DOCUMENTS

| | | |
|---|---|---|
| 5,413,345 A | 5/1995 | Nauck |
| 8,219,267 B2 | 7/2012 | Hamke et al. |
| 8,452,575 B2 | 5/2013 | Sato |
| 10,699,594 B2 | 6/2020 | Mermel et al. |
| 11,029,709 B1 | 6/2021 | Stepanyan et al. |
| 2004/0024500 A1 | 2/2004 | Campbell |

(Continued)

OTHER PUBLICATIONS

[No Author Listed], "Guide to Meteorological Instruments and Methods of Observation" World Meteorological Organization, WMO-No. 8., 2008, 681 pages.

(Continued)

*Primary Examiner* — Nathaniel T Woodward
(74) *Attorney, Agent, or Firm* — Fish & Richardson P.C.

(57) ABSTRACT

Methods and apparatus, including computer program products, implementing, and using techniques for estimating wind velocity. Measurements are obtained, which indicate two or more trajectories traversed by flying balls. Individual wind velocity estimates are determined for the two or more trajectories, wherein the determination comprises comparing a model acceleration of the ball with an observed acceleration of the ball, derived from the measurements. The aggregated wind velocity estimate is calculated as a weighted average of the determined two or more individual wind velocity estimates. The aggregated wind velocity estimate is used for generating ball trajectory information to be presented on an output device.

16 Claims, 5 Drawing Sheets

(56) References Cited

U.S. PATENT DOCUMENTS

| | | | |
|---|---|---|---|
| 2008/0182685 A1* | 7/2008 | Marty | A63B 69/38 |
| | | | 473/407 |
| 2009/0326887 A1 | 12/2009 | Chan et al. | |
| 2010/0210377 A1* | 8/2010 | Lock | A63B 69/3658 |
| | | | 473/409 |
| 2015/0027220 A1 | 1/2015 | Halfon et al. | |
| 2017/0239521 A1 | 8/2017 | Packard et al. | |
| 2018/0117400 A1 | 5/2018 | Martin et al. | |
| 2019/0051195 A1 | 2/2019 | De La Guardia Gonzalez et al. | |
| 2019/0087651 A1 | 3/2019 | Bose et al. | |
| 2019/0187168 A1 | 6/2019 | Mukai et al. | |
| 2020/0017112 A1 | 1/2020 | Sakurada | |
| 2020/0225031 A1 | 7/2020 | Johnson | |
| 2020/0406118 A1 | 12/2020 | Buscemi | |
| 2021/0182461 A1 | 6/2021 | Martin et al. | |
| 2021/0356492 A1 | 11/2021 | Kozacik et al. | |
| 2022/0111282 A1 | 4/2022 | Everhart et al. | |

OTHER PUBLICATIONS

International Search Report and Written Opinion in International Appln. No. PCT/EP2023/063200, mailed on Sep. 19, 2023, 13 pages.
Office Action in Swedish Appln. No. 2250616-6, dated Apr. 22, 2024, 9 pages.
Office Action in Swedish Appln. No. 2250616-6, dated Jan. 16, 2023, 9 pages.

* cited by examiner

WIND VELOCITY ESTIMATION

BACKGROUND

The present invention relates to estimating wind speed and direction, and more specifically, to estimating wind speed and direction in the context of a sports ball traveling through the air.

It is often desirable to know the trajectory of a sports ball (e.g., a golf ball, hereinafter simply referred to as a "ball") as it moves through the air for several reasons. In general, various types of hardware equipment, such as radar or cameras, can be used to measure a large number of instant locations of the ball as during a shot. The measured data can then be combined through using software to create a trajectory for the ball.

To calculate a trajectory that is as accurate as possible, it is helpful to know the wind conditions, as having that information reduces the number of free parameters used by the physics model in the software uses to calculate the trajectory of the ball. Furthermore, there may be situations in which a player may want to obtain information about a "normalized" version of their shot (i.e., a version that is compensated for the weather conditions and the type of ball being used), for example, to be able to better compare two individual shots to determine how certain types of adjustments the player makes to their posture or equipment affect their shots. Having accurate information about the wind speed and direction is important in such a determination.

In some physics models, the wind speed is a free parameter, i.e., the wind vector is unknown and is estimated based on the wind speed and direction that best fits the parts of the trajectory observed by the radar and/or optical sensors.

SUMMARY

Wind velocity estimation using the systems and techniques described in this document can provide one or more advantages, including avoiding volatility in wind estimates associated with performing physics modeling using data from only a single trajectory at a time. Note that a small deviation in the data measured by the radar(s) and/or camera (s) for a single shot might result in a wildly inaccurate wind estimate using traditional techniques. Using the systems and techniques described in this document can improve the estimation of wind speeds and/or directions, which enables more accurate calculations in which wind forms a factor, such as for ball trajectory determination.

In some aspects, the techniques described herein relate to a method for estimating wind velocity, including: obtaining measurements indicating two or more trajectories traversed by flying balls; determining individual wind velocity estimates for the two or more trajectories, wherein the determination includes comparing a model acceleration of the ball with an observed acceleration of the ball, derived from the measurements; and calculating the aggregated wind velocity estimate as a weighted average of the determined two or more individual wind velocity estimates. The aggregated wind velocity estimate is used for generating ball trajectory information to be presented on an output device.

In some embodiments, the trajectory measurements are made at least in part by a radar and/or a camera.

In some embodiments, determining an individual wind velocity estimate comprises solving an optimization problem that involves minimizing a loss function that compares the model acceleration of the ball with the observed acceleration of the ball.

In some embodiments, the model acceleration is calculated as a sum of an acceleration component due to gravity, an acceleration component due to drag, and an acceleration component due to lift.

In some embodiments, the optimization problem, in addition to optimizing for wind velocity, optimizes for an initial spin rate of the ball, a spin decay factor of the ball, and/or a spin angle of the ball.

In some embodiments, each of the two or more trajectories fulfill a minimum criterion with respect to a carry distance and/or a minimum observed fraction of the trajectory length.

In some embodiments, the two or more trajectories include trajectories for which measurements have been collected during a pre-defined time window.

In some embodiments, the pre-defined time window has a size of approximately 2-4 minutes.

In some embodiments, the aggregated wind velocity estimate is calculated in response to a new trajectory being generated by a flying ball.

In some embodiments, calculating the aggregated wind velocity estimate occurs at regular time intervals.

In some embodiments, the method further comprises using the aggregated wind velocity estimate as a starting wind velocity estimate for a subsequent trajectory estimation.

In some embodiments, the method further comprises using the aggregated wind velocity estimate to model a normalized trajectory that is not being affected by any wind.

In some embodiments, the weighted average is determined using an exponential moving average.

In some embodiments, separate aggregated wind velocity estimates are determined for different parts of a playing area.

In some aspects, the techniques described herein relate to a computer software product that when executed causes a data processing apparatus associated with a wind aggregator to perform one or more of the methods described above.

In some aspects, the techniques described herein relate to a system for estimating wind velocity, including: obtaining means, determination means, and calculating means. The obtaining means obtain measurements indicating two or more trajectories traversed by flying balls. The determination means determine individual wind velocity estimates for the two or more trajectories. The determination comprises comparing a model acceleration of the ball with an observed acceleration of the ball, derived from the measurements. The calculating means calculate an aggregated wind velocity estimate as a weighted average of the determined two or more individual wind velocity estimates.

In some aspects, the techniques described herein relate to a system for estimating wind velocity, comprising: means for generating an aggregated wind velocity estimate for two or more individual wind velocity estimates, produced for two or more measured trajectories of balls, in accordance with a model of ball acceleration and an observed ball acceleration; and means for providing ball trajectory information prepared in accordance with the aggregated wind velocity estimate.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for estimating wind velocity, based on recorded data about trajectories traversed by a ball, such as a golf ball. In general, data captured by sensors, such as cameras and/or radars, as a ball flies through the air, is processed by software to generate a trajectory for the ball. A wind velocity (that is, a wind vector describing both a wind direction and wind speed magnitude) is estimated from the data collected about each trajectory. Estimated wind velocities from several trajectories are then used to calculate an aggregated wind velocity estimate. As a result, a more robust and accurate wind velocity estimate can be obtained, compared to what can be derived from a single trajectory only. The aggregated wind velocity estimate can be updated over time, using data from the most recent set of trajectories, such that an accurate wind velocity is always available for various purposes. The estimated wind velocity can be used for a variety of purposes, such as an initial wind velocity estimate when estimating subsequent trajectories, or to approximate a "normalized" trajectory that describes what the trajectory would have looked like, were there no wind.

Figure 1:
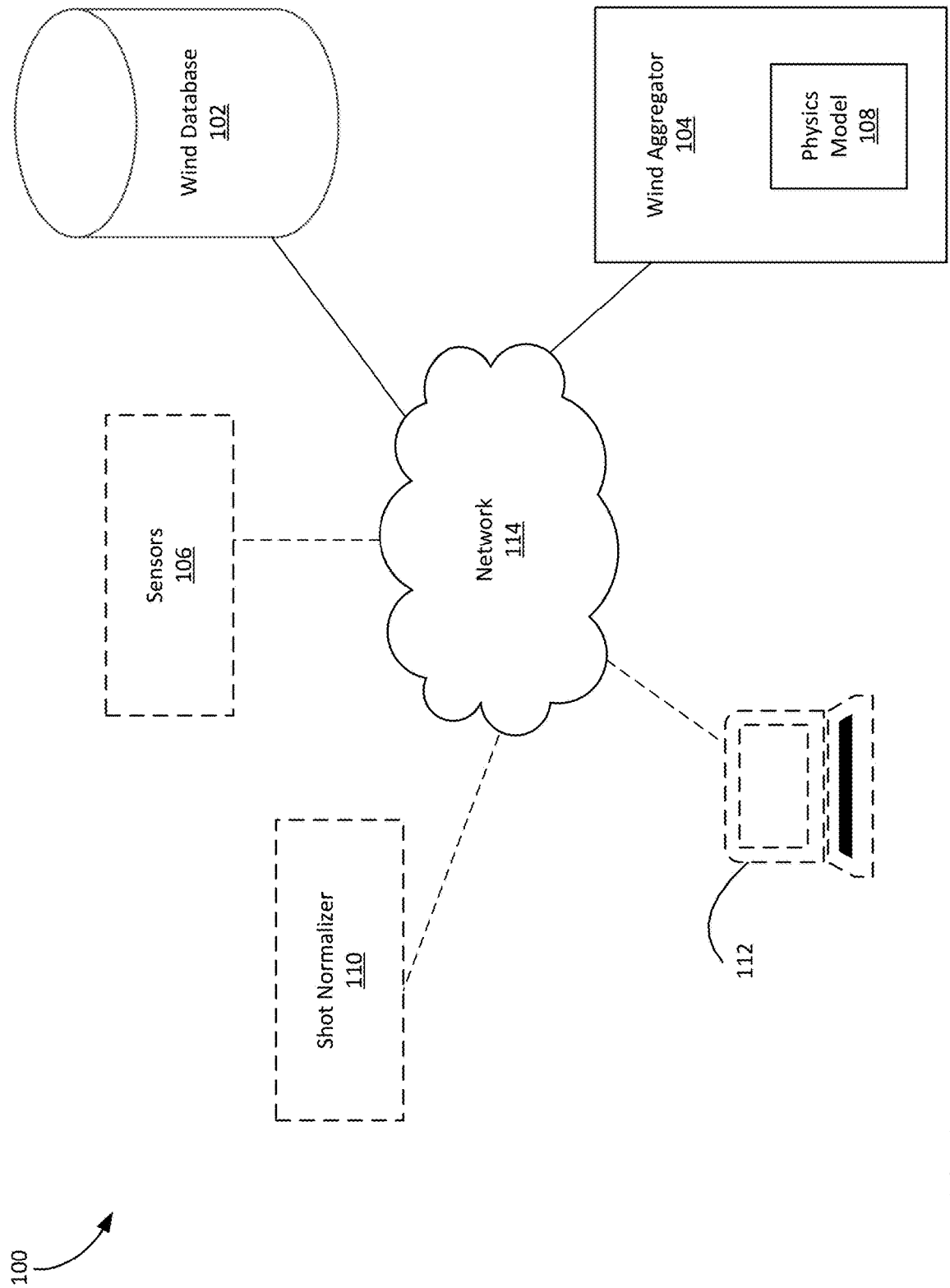
FIG. 1 is a schematic diagram of a wind estimation system, in accordance with some embodiments.

FIG. 1 is a block diagram showing the general architecture of a wind estimation system 100, in accordance with some embodiments. As can be seen in FIG. 1, the wind estimation system 100 comprises a wind database 102 and a wind aggregator 104, which communicate over a network 114. Optionally, the wind estimation system 100 can include one or more sensors 106, a shot normalizer 110, and/or a client 112, depending on the particular embodiment at hand. It should be noted that while only a single wind database 102, a single wind aggregator 104, etc., are illustrated in FIG. 1, this is only done for purposes of explanation and in various implementations, the wind estimation system 100 can be much larger and include several of each of these (and sometimes additional types of) components.

In the embodiment shown in FIG. 1, the wind database 102 contains current and historical data about individual trajectories, and calculated average wind velocities for multiple trajectories, as calculated by the wind aggregator 104. However, it should be realized that in other embodiments, further data may be saved, such as the calculated wind velocities for individual trajectories, etc., and further weather-related data, such as temperature, humidity, and/or time stamps for individual trajectories, etc. Thus, the embodiment shown in FIG. 1 should not be considered limiting. The wind aggregator 104 obtains data collected by the one or more sensors 106 about individual trajectories for balls and applies a physics model 108 to the data, to determine an estimated wind velocity for the individual trajectories. The wind aggregator 104 then calculates a weighted average of the individual estimated wind velocities as an aggregated wind velocity estimate, which can subsequently be used for various purposes. A more detailed description of the wind aggregator 104 in accordance with some implementations will be described below with respect to the flowchart of FIG. 3.

The wind database 102 and the wind aggregator 104 communicate over the network 114, which can be any combination of wired and/or wireless networks, including local networks, such as intranets, or global networks, such as the Internet. The network 114 can also include any combination of public and/or private networks. These various types of network configurations are familiar to those having ordinary skill in the art.

Figure 4A:
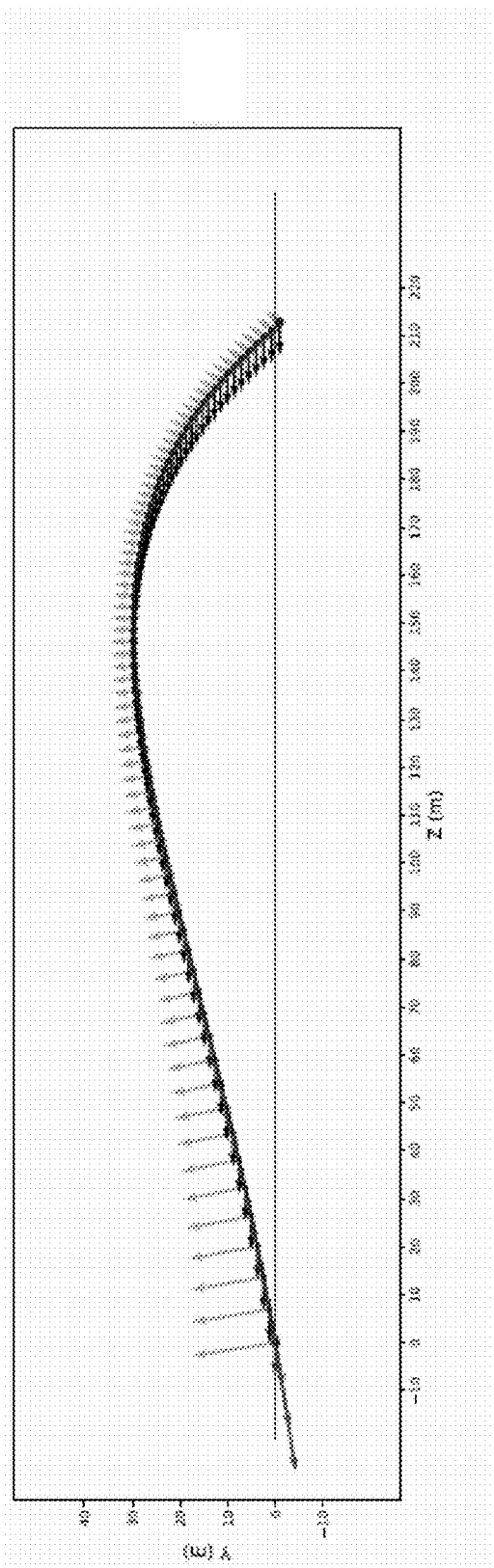
FIGS. 4A-4B show a portion of a user interface displaying a measured trajectory of a ball along with information about lift, drag and wind, in accordance with some embodiments.
Figure 4B:
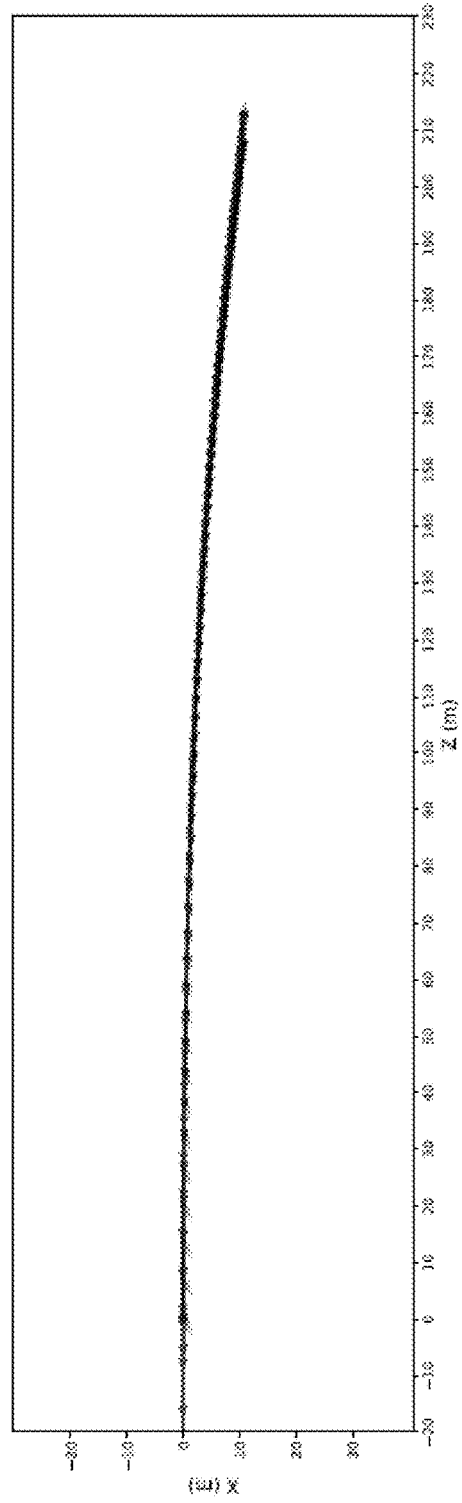

The wind estimation system 100 can optionally include a physical or virtual client 112, which can be used to display data relating to, for example, single shots, individual or aggregated wind velocities, statistics, player data, etc. on a user interface. Various software applications can run on the client 112 to display the data in a preferred way to a user of the wind estimation system 100. FIGS. 4A-4B and 5A-5B show examples of windows that can be displayed to a user on the user interface, in response to a selection being made by the user. In FIGS. 4A-4B, the user has selected to view data for an individual shot.

More specifically, FIG. 4A shows measured positions of a ball along a trajectory. The length of the shot is shown on the horizontal axis (i.e., the Z-axis) and the height of the shot is shown on the vertical axis (i.e., the Y-axis). In addition, the user has an option of selecting further information to be displayed, such as lift, drag, and wind, which are illustrated by the arrows along the trajectory. FIG. 4B shows a similar view to that of FIG. 4A, but in this case, the user has selected to view how the ball moves sideways (i.e., in the horizontal plane) during a shot, which is illustrated by the X-axis of FIG. 4B. Conceptually, this can be thought of as having a bird's eye view, looking straight down at the ball during the shot. In some implementations, the views of FIGS. 4A-4B can be combined into a 3D representation of the trajectory, where all three axes are shown at once, and the user can select different vantage points from which the ball trajectory can be viewed. The display of the trajectory and any optional additional information can be done in a virtual reality or an augmented reality system provided by using the client 112.

Figure 5A:
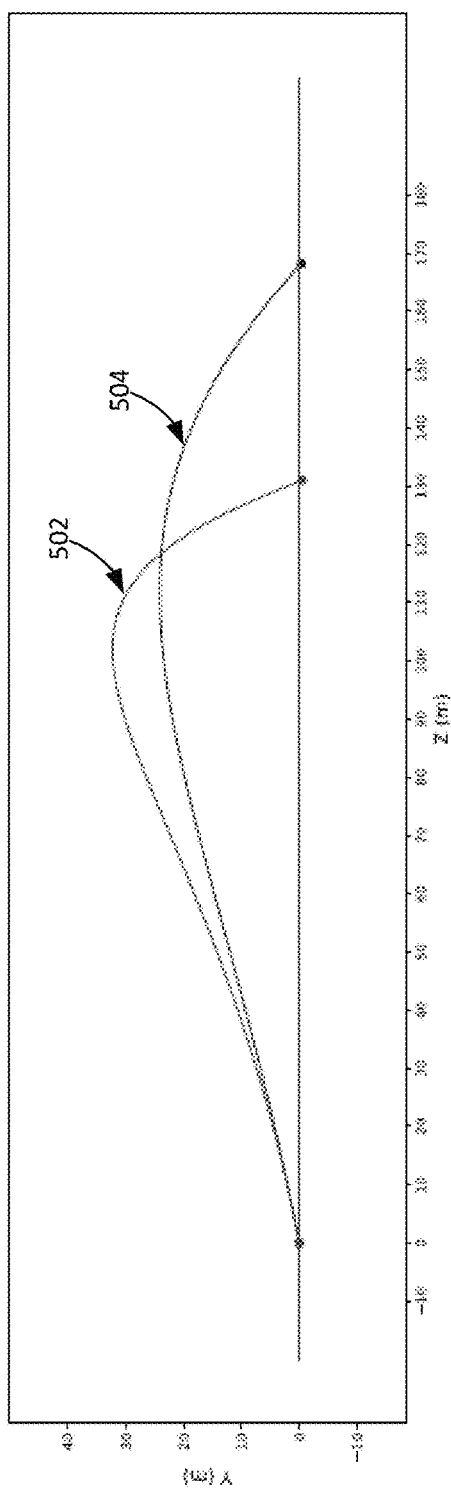
FIGS. 5A-5B show a portion of a user interface displaying a measured trajectory and a normalized trajectory, respectively, in accordance with some embodiments.
Figure 5B:
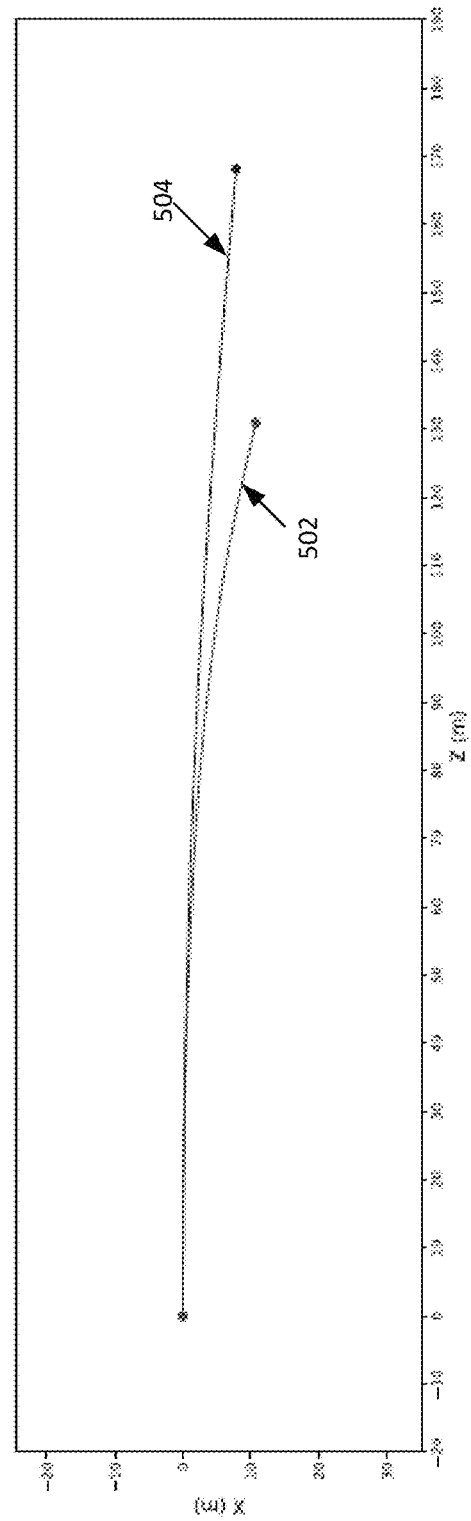

Some embodiments of the wind estimation system 100 include a shot normalizer 110, which can be used to determine a "normalized" trajectory, in which the aggregated wind velocity estimate has been "subtracted" from a recorded trajectory to determine what the trajectory would have looked like, were there no wind. The client 112 can be used to visualize such information to a user of the wind estimation system 100. FIGS. 5A-5B show corresponding user interface views to those of FIGS. 4A-4B, respectively. However, in this case, the user has selected to show a comparison between two trajectories for the ball; one measured trajectory 502 (as shown in FIGS. 4A-4B) and one "normalized" trajectory 504. The normalized trajectory 504 displays what the shot would have looked like, were there no wind. That is, the calculated wind velocity is "subtracted" before displaying the shot to the user on the user interface. The user can select whether to view the original shot 502, the normalized shot 504, or a comparison between the two, as shown in FIGS. 5A-5B on the user interface, to gain valuable information that will inform the user about how to adjust their technique or choice of clubs, for example.

As was mentioned above, the wind estimation system 100 obtains input data from a set of sensors 106 that capture data about a ball in flight through a three-dimensional (3D) space. The ball can be, for example, a golf ball or another type of object that is struck, kicked, or thrown (e.g., a baseball, a soccer ball, or a football/rugby ball) to travel through the air. In some implementations, the 3D space is a golf practice area, such as a golf driving range; a grass field; or another open area into which objects can be launched. For example, the 3D space can be a playing area for a sport, such as a golf course, where the ball is struck from a launch area, such as a golf tee for a particular hole on the golf course, or an intermediate landing point for a golf ball in play on the course, to a target, such as the cup at the end of the particular hole on the golf course or an intermediate landing point for a golf ball in play on the course. Other implementations are also possible, such as the launch area being one of multiple designated tee areas along a tee line where golfers can hit golf balls into an open field, or the launch area being one of multiple designated tee areas in the stands at a sports stadium where golfers can hit golf balls over and onto the playing field of the sports stadium.

Typically, two or more sensors, such as cameras (e.g., stereo camera pairs), radar devices (e.g., Doppler radar devices), or combinations thereof (e.g., a camera used to sense an angle to the ball in combination with a radar used to sense a distance to the ball), are connected to the wind estimation system 100, either directly as shown in FIG. 1, or through one or more computing devices, which may perform various levels of processing on the data collected by the sensors 106 prior to sending the processed data to the wind aggregator 104 of the wind estimation system 100.

Generally, the sensors 106 are located close to the launch area for the ball. However, in some implementations, one or more of the sensors 106 can be located along one or both sides of the 3D space, and/or on the other side of the 3D space opposite the launch area. For example, at a golf tournament, the camera can be located behind the green, looking back at the golfer, assuming that shots will be hit towards the green. Thus, in various implementations, the sensors can observe and track objects that move away from a sensor, toward a sensor, and/or through the field of view of a sensor.

The sensors 106 may have different sensitivity (e.g., different image sensor resolutions), and be of varying types (e.g., radars, cameras, or combinations thereof) which may affect the quality of the data that gets transmitted to the wind estimation system 100. However, the sensitivity of the sensors 106 does not affect the how the wind aggregator 104 operates, which will be described in further detail below with reference to FIG. 3. Thus, many variations of sensor setups and configurations will be apparent to those having ordinary skill in the art, based on the situation at hand.

Figure 2:
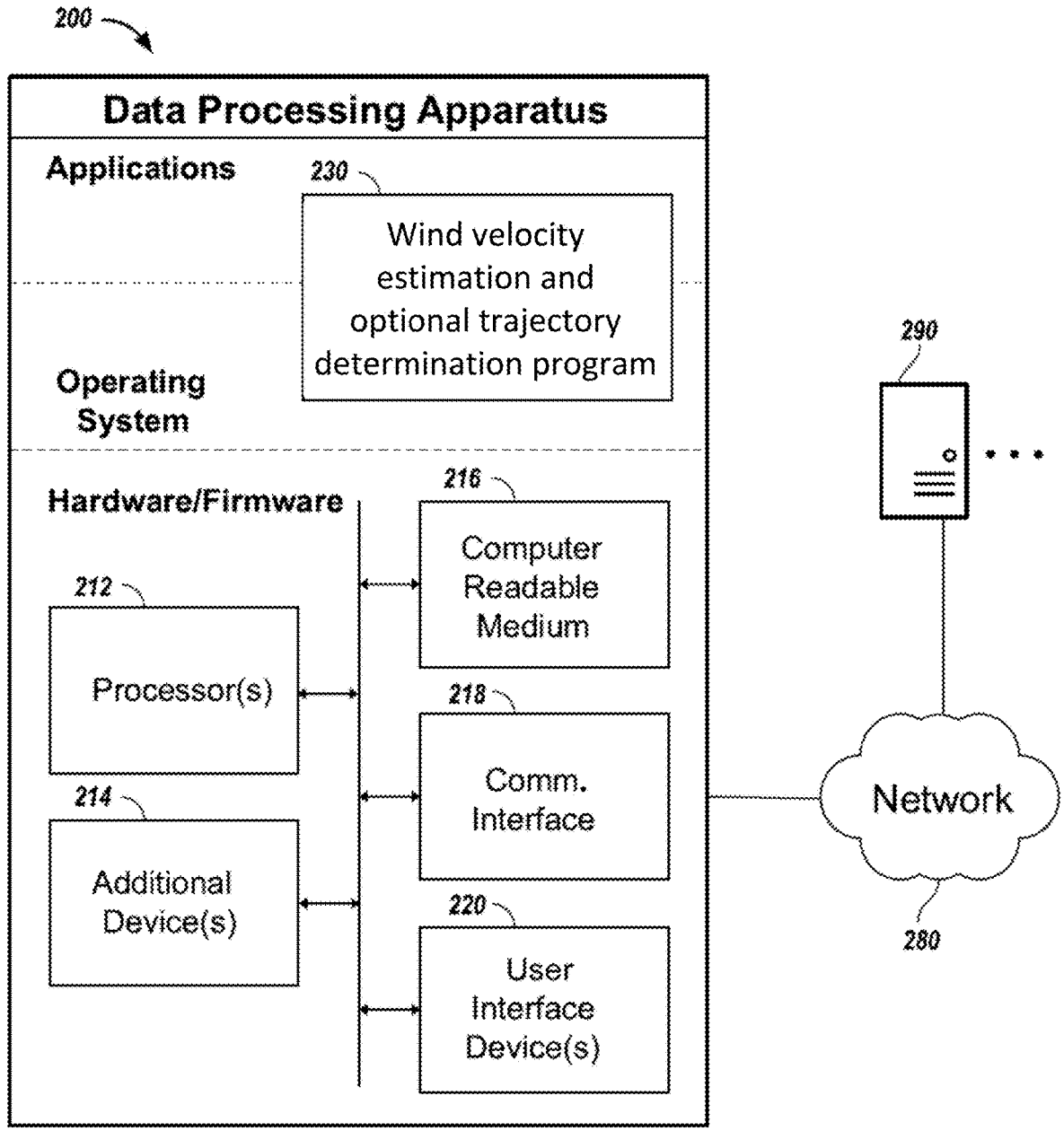
FIG. 2 is a schematic diagram of a data processing system of the wind aggregator, in accordance with some embodiments.

Distinct types of computers can be used in the system. The essential elements of a computer are a processor for performing instructions and one or more memory devices for storing instructions and data. As used herein, a "computer" can include a server computer, a client computer, a personal computer, embedded programmable circuitry, or a special purpose logic circuitry. FIG. 2 is a schematic diagram of a data processing system including a data processing apparatus 200, which represents an implementation of the wind aggregator 104. The data processing apparatus 200 can be connected with one or more computers 290 through a network 280.

The data processing apparatus 200 can include various software modules, which can be distributed between an applications layer and an operating system. These can include executable and/or interpretable software programs or libraries, including a program 230 that operates as a wind velocity estimation program for a single trajectory, or an aggregated wind velocity estimator, for example. The number of software modules used can vary from one implementation to another. Also, in some cases, the program 230 can be implemented in embedded firmware, and in other cases, the program 230 can be implemented as software modules that are distributed on one or more data processing apparatus connected by one or more computer networks or other suitable communication networks.

The data processing apparatus 200 can include hardware or firmware devices including one or more hardware processors 212, one or more additional devices 214, a non-transitory computer readable medium 216, a communication interface 218, and one or more user interface devices 220. The processor 212 is capable of processing instructions for execution within the data processing apparatus 200, such as instructions (e.g., of the program 230) stored on the non-transitory computer readable medium 216, which can include a storage device such as one of the additional devices 214.

In some implementations, the processor 212 is a single or multicore processor, or two or more central processing units (CPUs). The data processing apparatus 200 uses its communication interface 218 to communicate with one or more computers 290, for example, over the network 280. Thus, in various implementations, the processes described can be run in parallel or serially, on a single or multi-core computing machine, and/or on a computer cluster/cloud, etc.

Examples of user interface devices 220 include a display, a touchscreen display, a speaker, a microphone, a tactile feedback device, a keyboard, a mouse, and a headset or heads-up display of a virtual reality or augmented reality environment system. Moreover, the user interface device(s) need not be local device(s) 220 but can be remote from the data processing apparatus 200, e.g., user interface device(s) 290 accessible via one or more communication network(s) 280. For example, the user interface device(s) 220/290 can be a smartphone or a tablet computer of the user, e.g., for an augmented reality implementation. The data processing apparatus 200 can store instructions that implement operations as described in this document, for example, on the non-transitory computer readable medium 216, which can include one or more additional devices 214, for example, one or more of a floppy disk device, a hard disk device, an optical disk device, a tape device, and a solid-state memory device (e.g., a RAM drive).

Moreover, the instructions that implement the operations described in this document can be downloaded to the non-transitory computer readable medium 216 over the network 280 from one or more computers 290 (e.g., from the cloud). In some implementations, the data processing apparatus 200 is a smartphone or a tablet computer. In some implementations, the RAM drive is a volatile memory device to which the instructions are downloaded each time the computer is turned on.

Figure 3:
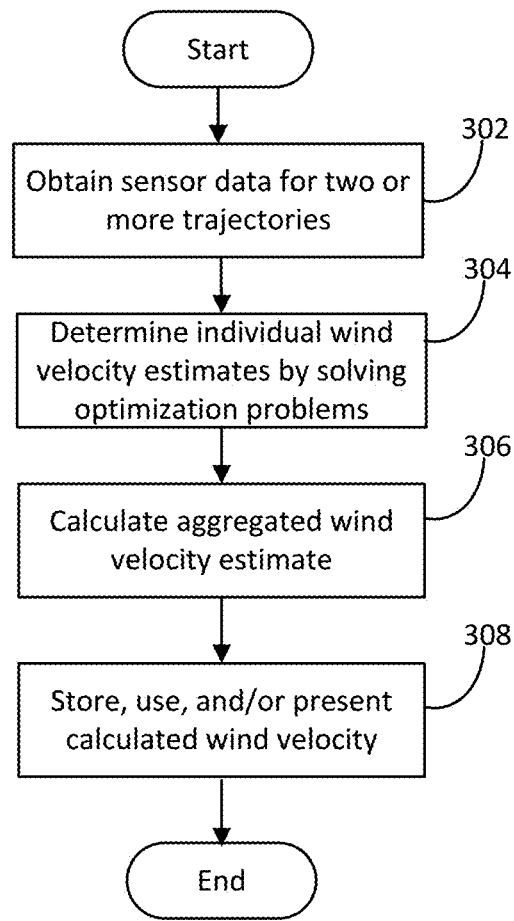
FIG. 3 is a flowchart illustrating the operation of the wind aggregator when determining an aggregated wind velocity estimate, in accordance with some embodiments.

FIG. 3 is a flowchart illustrating a method 300 performed by the wind aggregator 104 when determining an aggregated wind velocity estimate, in accordance with some embodiments. As can be seen in FIG. 3, the method 300 starts by obtaining 302 sensor data for two or more ball trajectories, collected by the sensors 106, as described above. The obtaining 302 can involve retrieving the data from another computer/system or from local memory where that data has been actively pushed, or the obtaining 302 can involve passively receiving the data on an ongoing basis. Depending on the embodiment at hand, the sensor data may be preprocessed to various degrees by other computing devices prior to being obtained by the wind aggregator 104, or it may be obtained as raw data and the wind aggregator 104 can operate directly on that raw data from the sensors 106.

In some embodiments, this pre-processing can include, for example, noise reduction, as the parameters measured by the sensors can often be noisy due to a number of factors, such as the hardware of the cameras (e.g., the type of image sensor affects the resolution, i.e., the accuracy of where the center of the ball is in the images), the mathematical model of the camera (i.e., a pinhole camera is assumed) used when converting camera images to distances, the accuracy by which directions/vectors can be determined, etc. Therefore, pre-processing of the sensor data in terms of noise reduction may be beneficial before the sensor data is sent to the wind aggregator 104, so that the observed data from the sensors 106 is in some sense enhanced compared to the raw data recorded by the sensors 106.

Such noise reduction may involve, for example, selecting a number of points along a measured trajectory, fitting a polynomial to those points, and then determining a difference value between a large number of measured points along the trajectory and the corresponding points along the fitted polynomial, for example, using a least squares difference method or another statistical method serving that same general purpose. This method can be repeated a number of times and with different polynomials being fitted to different measured points, until a satisfactory fitted polynomial has been found, and then the values from this resulting "polynomial trajectory" can be used as the input values to the wind aggregator 104. What is considered as "satisfactory" in this context may depend on a number of factors, such as the available time and processing resources, but typically either a set number of iterations are performed, or the iterations continue until a certain predetermined quality threshold of the polynomial trajectory has been found, where the polynomial trajectory is considered to provide better input values to the wind aggregator 104 than the raw data measured by the sensors 106. This noise filtering reduces the potential adverse effects of "outliers" resulting from poor measurement data from the sensors 106, and provides better input parameters for the wind aggregator 104 to be used as described below.

A wind velocity estimate is determined 304 for each shot (i.e., for each trajectory) by the wind aggregator 104. In doing so, the wind aggregator 104 uses a physics model 108, in which the wind estimation is determined as a solution to an optimization problem, as will now be described. However, it should be noted that there may be other methods that can also be used to determine wind speed, as well as variants of the method that is presented herein, which can consider further physical parameters. Thus, the physics model 108 and optimization problem presented herein should not be construed as limiting the scope of the invention. Furthermore, for the sake of clarity, it should be noted again that the concept of velocity as used in this description refers to a vector quantity, i.e., a direction and a magnitude, and just not one or the other as may often be done in colloquial language use.

As was noted above, when calculating a wind velocity estimate for an individual shot, the wind estimation model uses an optimization problem, which compares a calculated model acceleration a of the golf ball to the actual observations of the acceleration from the trajectory a, and where it is desirable to minimize the squared difference loss function L:

$$L = \sum_t (\hat{a}(t) - a(t))^2$$

The model acceleration, â(t) comes from $$\hat{a}(t) = g + \hat{a}_D(t) + \hat{a}_L(t)$$

where
g is the gravitation vector affecting the ball
$\hat{a}_D$ is the drag acceleration in the model
$\hat{a}_L$ is the lift acceleration in the model.
The drag and lift accelerations are in turn defined as:

$$\hat{a}_D(t) = u_D \cdot C_D(\mathcal{v}(t), \alpha_m(t)) \cdot K \cdot v(t)^2$$

$$\hat{a}_L(t) = u_L \cdot C_L(\mathcal{v}(t), \alpha_m(t)) \cdot K \cdot v(t)^2$$

where
$C_D(v(t), \alpha_m(t))$ is the drag coefficient as a function of the speed and spin of the ball
$C_L(v(t), \alpha_m(t))$ is the lift coefficient as a function of the speed and spin of the ball
$\mathcal{v}(t) = \|v_{air}(t)\|$ is the speed of the ball (relative to the air)
K is a constant that involves the ball mass (m), the ball surface area (A), and the density
(ρ) of the air. In the present model, the constant K is defined as:

$$K = \frac{\rho \cdot A}{2.0 \cdot m}$$

$\alpha_m(t)$ is the spin magnitude of the ball
$u_D$ and $u_L$ are direction vectors defined as:

$$u_D = \frac{-v_{air}(t)}{\|v_{air}(t)\|}, u_L = \alpha_d \times \frac{v_{air}(t)}{\|v_{air}(t)\|}$$

and $$\alpha_m(t) = \theta_1 + \theta_2 t, \alpha(t) = \alpha_d \alpha_m(t)$$

$$v_{air}(t) = v(t) - v_w$$

and
$v_{air}(t)$ is the velocity of the ball relative to the air
$\alpha_d$ is the spin (unit) vector, and is assumed to be constant over the trajectory
$v_w$ is the wind velocity vector, with a y-component that is always 0
v(t) is the velocity vector of the ball
$\theta_1$ is the initial spin rate of the ball, and $\theta_2$ is a spin decay factor.

In some implementations the wind velocity vector $v_w$ is assumed to have a y-component that is always set to zero. However, in other implementations, the wind velocity vector $v_w$ can have a non-zero y-component, that is, be a 3D vector, or be a vector that varies with the height above ground. As the skilled person knows, there are different standardized wind models that describe how the wind varies with the height above ground. For example, one such model is described in the "Guide to Meteorological Instruments and Methods of Observation" WMO-No. 8, by the World Meteorological Organization, Geneva, Switzerland, 2008.

The unknown variables to be optimized over are $\theta_1$, $\theta_2$, $\alpha_d$, $v_w$. This means that the optimization will find the initial spin rate, the spin decay factor, the spin angle, and the wind velocity for a given trajectory.

The loss function L can be minimized, for example using a descent-based optimization method, such as a Newton, quasi-Newton, or gradient method, as are familiar to those having ordinary skill in the art.

In some implementations, a Huber loss function is used instead of using the quadratic loss directly, as the inventors have found the Huber loss function to improve numerical stability and convergence, due to being less sensitive to outlier data compared to the quadratic loss function.

In some implementations, directional vectors $u_D$ and $u_L$ are normalized into unit vectors after each optimization step in order to prevent the norm of the directional vector from becoming larger or smaller than 1. This normalization has been proven to enhance numerical stability of the optimization model. In an alternative implementation, the directional vectors $u_D$ and $u_L$ can instead be represented by angles, which obviates the need to normalize the vectors. A full 3D vector can be represented by either two angles, or by a single angle if one assumes that the ball does not have any gyro spin (i.e., rotation along the direction of travel).

In some implementations, a limited-memory Broyden-Fletcher-Goldfarb-Shanno (BFGS) optimization algorithm with line-search (using strong Wolfe criteria) is used. This is an optimization algorithm of the quasi-Newton type, which uses an iterative method for solving unconstrained nonlinear optimization problems, and is familiar to those having ordinary skill in the art.

Some implementations use an L-BFGS algorithm, which is an algorithm that approximates the BFGS algorithm, using a limited amount of computer memory. The BFGS/L-BFGS algorithms are standard algorithms for solving unconstrained numerical optimization problems, and are familiar to those having ordinary skill in the art. It should be noted that the various embodiments of the invention described herein relate both to formulating the optimization problem (e.g., the loss function), and to selecting the particular optimization algorithm to use when solving the problem, and not exclusively to one or the other.

There are several standard algorithms that could be used in this context, which include: Gradient descent, Newtons method, BFGS, L-BFGS. It should be noted that this is not an exhaustive list of possible algorithms, but rather suggestions of suitable algorithms. When selecting what algorithm to use, there are a number of considerations that need to be made, such as how many iterations it takes for the algorithm to converge, how much time each iteration takes, how stable is the algorithm, etc.

For example, gradient descent tends to be relatively stable but typically takes many iterations to converge. However, each iteration is usually fast to compute. But overall, the time for it converge is the usually the longest among the algorithms listed above. Newtons method converges fast but can sometimes be unstable. Each iteration is also expensive to compute to compared to the other methods. BFGS converges almost as fast as Newtons method and is more stable. Each iteration is much less expensive than Newtons method, but a bit more expensive than Gradient descent. In time, BFGS usually converges the fastest. As was mentioned above, L-BFGS is a slight modification of BFGS to make algorithm faster and use less memory. Such efficiency considerations are often important for use cases, and the L-BFGS algorithm can therefore often be a better choice than the conventional BFGS algorithm.

Two significant challenges involve how to manage the amount of noise and how to manage outliers in the data. These challenges are addressed by smoothing the data and using a Huber loss function, as described above, normalizing the spin vector to prevent it from diverging from a unit vector, and using only those shots that can provide accurate wind estimates, as will be described in further detail below.

Further, it should be noted that while the spin magnitude, $\alpha_m(t)$, of the ball is expressed above as a linear function in the described embodiment, it can be any decreasing function of t, such as exponential decay, quadratic decay, etc., in other, alternative embodiments.

Since the observed acceleration by the sensors 106 is subject to noise, some implementations use a polynomial moving-window approach to reduce the noise. In particular, a Savitzky-Golay filter can be applied to data points collected by the sensors 106 for the purpose of smoothing the data. This is achieved through convolution, by fitting successive sub-sets of adjacent data points with a low-degree polynomial by the method of linear least squares. When the data points are equally spaced, an analytical solution to the least-squares equations can be found, in the form of a single set of "convolution coefficients" that can be applied to all data sub-sets, to give estimates of the smoothed signal (or derivatives of the smoothed signal) at the central point of each sub-set. In other implementations, noise reduction can be achieved, for example, by using convolution with a Gaussian kernel, or by using a moving average window. The selection of a size of the window and the degree of the polynomial typically depends on the time resolution and noise level of the sensors 106, and will thus vary based on the particular setup at hand. However, it is considered that such a selection of parameters can be done by the skilled artisan without undue experimentation.

Returning now to FIG. 3, once several wind velocity estimates have been determined, the wind aggregator 104 calculates 306 an aggregated wind velocity estimate. In some implementations the aggregated wind velocity estimate is calculated in a two-step process. First, an average wind velocity is calculated, using all the wind velocities computed during a time window representing the N last minutes. This average wind velocity is a "raw wind velocity" value for the time window. The length of the time window depends on the number of shots needed to make accurate wind estimates. The longer the time window, the more likely it is that a sufficient number of shots occur during that time window. In general, more shots tend to lead to better estimates. What is considered a sufficient number of shots in this context depends largely on the accuracy of the tracking sensor. However, it should be noted that as the time window increases, the wind might change during the time window, which can lead to an incorrect wind estimate because the assumption that the wind is constant during the time window no longer holds true. Thus, it is important to find a good balance between these competing factors. Some implementations use a fixed time window, while other implementations use a dynamic time window can be dynamic. For example, the time window can be made dependent on the number of shots available, such that it becomes shorter when more shots are available. In some implementations, N is approximately 2-4 minutes.

Next, an Exponential Weighted Moving Average (EWMA) is applied to this time series to obtain the aggregated wind velocity estimate. The EWMA is chosen as it is simple to implement and makes it possible to place a greater weight and significance on the most recent data points, rather than applying an equal weight to all observations in the period. However, the EWMA is merely one of many models that can be used and that many others are apparent to those having ordinary skill in the art. For example, in some implementations, a moving average can be used, with weights such that more recent data points have a higher weight, for example, [0.2, 0.3, 0.5] when averaging three data points.

In some implementations, only wind velocity estimations for individual shots that have a minimum length are used in calculating the aggregated wind velocity estimate. The reason being that for shorter shots, the ball has a lower velocity, and thus the influence on the wind velocity of the estimated spin will increase, leading to an increase in the uncertainty for the estimated wind velocity. As a result, a shot that is too short, may actually have a negative impact on the estimated wind velocity for the shot, and it is therefore better not to include that shot in the calculations. Exactly what is considered as "long enough" in this context is a parameter that can be determined by the skilled artisan using experimentation, but one example criterion is a carry distance of at least 100 meters with at least 70% of the trajectory being observed (as opposed to being estimated/extrapolated) by the sensors 106. However, this of course also depends on the sensitivity and noise levels of the sensors 106. While 70% may be suitable for one type of sensor, there may be other sensors where smaller or larger carry distances and/or percentages can be used.

Once the weighted average wind velocity has been computed, it can be stored 308 in the wind database 102, displayed to a user on the client 112 (or apparatus 200 or device 220), and/or be used by the shot normalizer 110, as discussed above with reference to FIGS. 4A-4B and 5A-5B, respectively, which ends the process. Typically, the wind database 102 also stores the time when the weighted average wind velocity was calculated. Typically, the process 300 runs on a schedule, for example, when N seconds have elapsed since the most recent average wind velocity was computed. Alternatively, the process can run whenever a new shot is recorded. Of course, these are merely two examples, and there may be many other triggering mechanisms that can be envisioned by those having ordinary skill in the art for when the process 300 should be run.

In some implementations, each time the process 300 is run, it uses the data collected for any shots that have occurred since the previous time the process 300 was run, which ensures that all shots that fulfill the eligibility criteria (such as a carry distance of at least 100 meters with at least 70% of the trajectory observed, as discussed above) will be taken into consideration.

As was mentioned above, the aggregated wind velocity estimate uses recent shots only. Therefore, in some implementations, any aggregated wind velocity estimate value has an expiration time (for example, 20 minutes) if no new shots have occurred (and no new aggregate wind velocity estimate has been computed). But of course, this expiration parameter is configurable.

In some implementations, every time the wind aggregator 104 processes a new shot using the physics model 108, the most recent aggregated wind velocity estimate is used as an initial wind velocity in a first iteration of a converging computational model, such as the one described above. Therefore, the aggregation method described herein can be used with any physics model for which a current wind estimate is an input.

Further, as was mentioned above, one use of the aggregated wind velocity estimate is to use it as an input in a shot normalizer 110 to calculate a normalized shot. When determining the normalized shot by the shot normalizer 110, the aggregated wind velocity that was used as the initial wind velocity in the physics model for that shot can be used. The reason for choosing this aggregated wind velocity estimate for normalization purposes, rather than a more recent one, is because this aggregated wind velocity estimate was the best possible wind velocity estimate at the time of the shot. A more recent aggregated wind velocity estimate might be affected by subsequent shots, and the wind may have changed since the shot was made, and not accurately reflect the wind conditions at the time of the shot. Shot normalization is merely one application in which the aggregated wind velocity estimate can be used, and various other uses of the aggregated wind velocity estimate can be made. In any case, the resulting normalized shot (or other shot data resulting from other uses of the aggregated wind velocity estimate) can be displayed to the user on the client 112 (or apparatus 200 or device 220), and/or be further processed to yield useful information to the user.

Typically, the aggregated wind velocity estimate is calculated as a single value for an entire, playing area. However, as a playing area (e.g., a range) may be fairly large, the wind may vary between different parts of the playing area, such as the outer edges and the middle, for example. Therefore, in some implementations, the aggregated wind velocity estimate can be calculated as separate estimations for different subsections of a playing area, using shot data from each respective subsection only and the wind database may contain data about what part of the playing area the aggregated wind velocity estimate applies to. The number of subsections can vary, for example, depending on the size of the playing area, or the specific layout and configuration of the playing area. For example, the playing area can be divided into different regions based on where the shots are being hit from, and each region can have its own wind estimate, as described herein. In some cases, regions may overlap. It should be noted that this type of division into regions assumes that the wind either is constant or depends on the altitude (but it is still constant at a predetermined altitude). In practice, golf shots are long and there may be different wind conditions at the start and end of a ball trajectory (i.e., the hitting area, and where the ball lands, respectively) which, for example, may depend on the surrounding terrain (trees, buildings, etc.). The general principles described herein apply also in these situations, but more sophisticated modeling may be needed to account for the effect of wind variations along the trajectory.

The present invention also relates to a computer software function for estimating wind velocity according to what has been described above. Such a computer software function is then arranged to, when executing, perform the above-described obtaining trajectories, determining individual wind velocity estimates, and calculating an aggregated wind velocity estimate. The computer software function is arranged to execute on physical or virtual hardware of the wind aggregator 104 of system 100 and/or the data processing apparatus 200, as described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various computing model infrastructures, such as web services, distributed computing, and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and one or more processors of any suitable digital computer. Generally, a processor will receive instructions and data from a read-only memory (ROM) or a random-access memory (RAM) or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROM and DVDROM disks; network attached storage; and various forms of cloud storage. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be sensory feedback, e.g., visual feedback, auditory feedback, or tactile feedback; and input from the user can be received in various forms, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any suitable combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but as descriptions of features specific to implementations of the invention. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and the described program components and systems can be integrated together in a single software product or packaged into multiple software products.

Thus, embodiments of the invention have been described. Other embodiments are within the scope of the following claims. For example, the description above focuses on wind velocity estimation in the context of the motion of a golf ball, but the systems and techniques described are also applicable to other types of objects that move through the air and are affected by wind, such as for baseball or skeet shooting, as well as non-sports applications. Furthermore, it should be noted that while two sensors are used in the embodiments described herein to measure the trajectory of the ball, there are other embodiments in which a single sensor (such as a Doppler radar, for example) can be used to measure both angle and distance, and thus no further sensors are needed.

What is claimed is:

1. A method for estimating wind velocity, comprising:
   obtaining measurements indicating two or more trajectories traversed by flying balls;
   determining individual wind velocity estimates for the two or more trajectories, wherein the determining comprises comparing a model acceleration of the ball with an observed acceleration of the ball, derived from the measurements;
   calculating an aggregated wind velocity estimate as a weighted average of the determined two or more individual wind velocity estimates; and
   using the aggregated wind velocity estimate for generating ball trajectory information to be presented on an output device.

2. The method of claim 1, wherein the trajectory measurements are made at least in part by one or more of: a radar, a camera, or both.

3. The method of claim 1, wherein determining an individual wind velocity estimate comprises:
   solving an optimization problem that involves minimizing a loss function that compares the model acceleration of the ball with the observed acceleration of the ball.

4. The method of claim 3, wherein the model acceleration is calculated as a sum of an acceleration component due to gravity, an acceleration component due to drag, and an acceleration component due to lift.

5. The method of claim 4, wherein the optimization problem, in addition to optimizing for wind velocity, optimizes for one or more of: an initial spin rate of the ball, a spin decay factor of the ball, a spin angle of the ball, or a combination thereof.

6. The method of claim 1, wherein each of the two or more trajectories fulfill a minimum criterion with respect to at least one of: a carry distance, and a minimum observed fraction of the trajectory length.

7. The method of claim 1, wherein the two or more trajectories include trajectories for which measurements have been collected during a pre-defined time window.

8. The method of claim 7, wherein the pre-defined time window has a size of 2-4 minutes.

9. The method of claim 1, wherein calculating the aggregated wind velocity estimate is performed in response to a new trajectory being generated by a flying ball.

10. The method of claim 1, wherein calculating the aggregated wind velocity estimate occurs at regular time intervals.

11. The method of claim 1, further comprising:
    using the aggregated wind velocity estimate as a starting wind velocity estimate for a subsequent trajectory estimation.

12. The method of claim 1, further comprising:
    using the aggregated wind velocity estimate to model a normalized trajectory that is not affected by any wind.

13. The method of claim 1, wherein the weighted average is determined using an exponential moving average.

14. The method of claim 1, wherein separate aggregated wind velocity estimates are determined for different parts of a playing area.

15. A non-transitory computer readable medium encoding a computer software product arranged to, when executed, perform operations comprising:
    obtaining measurements indicating two or more trajectories traversed by flying balls;
    determining individual wind velocity estimates for the two or more trajectories, wherein the determining comprises comparing a model acceleration of the ball with an observed acceleration of the ball, derived from the measurements;
    calculating an aggregated wind velocity estimate as a weighted average of the determined two or more individual wind velocity estimates; and
    using the aggregated wind velocity estimate for generating ball trajectory information to be presented on an output device.

16. A system for estimating wind velocity, comprising:
    receiving means for receiving measurements indicating two or more trajectories traversed by flying balls;
    determination means for determining individual wind velocity estimates for the two or more trajectories, wherein the determination comprises comparing a model acceleration of the ball with an observed acceleration of the ball, derived from the measurements;
    calculating means for calculating an aggregated wind velocity estimate as a weighted average of the determined two or more individual wind velocity estimates; and
    generating means for using the aggregated wind velocity estimate to generate ball trajectory information to be presented on an output device.

* * * * *